US007234207B2

(12) United States Patent
Goldberg

(10) Patent No.: US 7,234,207 B2
(45) Date of Patent: Jun. 26, 2007

(54) NOVELTY FIGURINE AND CARABINER STORAGE ASSEMBLY

(75) Inventor: Edward Goldberg, Teaneck, NJ (US)

(73) Assignee: Forever Green Holdings LLC, Leonia, NJ (US)

( * ) Notice: Subject to any disclaimer, the term of this patent is extended or adjusted under 35 U.S.C. 154(b) by 96 days.

(21) Appl. No.: 10/689,226

(22) Filed: Oct. 20, 2003

(65) Prior Publication Data
US 2005/0081347 A1   Apr. 21, 2005

(51) Int. Cl.
A63H 3/00 (2006.01)
(52) U.S. Cl. .................. 24/3.7; 24/3.12; 224/269; 446/71; 446/76
(58) Field of Classification Search ............ 446/71, 446/72, 73, 76; 224/269; 206/457; 24/3.1, 24/3.7, 3.9, 3.8, 3.11, 3.12
See application file for complete search history.

(56) References Cited

U.S. PATENT DOCUMENTS

| 1,566,801 | A | * | 12/1925 | Millard ..................... 446/99 |
| D73,258 | S | * | 8/1927 | Heard .................. D3/271.3 |
| 3,563,430 | A | * | 2/1971 | Forrest ..................... 224/255 |
| 4,765,460 | A | * | 8/1988 | Vigueras Pacheco ...... 206/38.1 |
| 4,768,648 | A | * | 9/1988 | Glass ...................... 206/38 |
| 4,815,999 | A | * | 3/1989 | Ayon et al. ................ 446/73 |
| 4,946,413 | A | * | 8/1990 | Lehmann et al. ........... 446/28 |
| 5,005,266 | A | | 4/1991 | Fister et al. |
| 5,270,909 | A | | 12/1993 | Weiss et al. |
| 6,223,372 | B1 | | 5/2001 | Barber |
| 6,247,730 | B1 | * | 6/2001 | Henderson et al. ......... 281/51 |
| 6,350,169 | B1 | * | 2/2002 | Holt ....................... 446/327 |
| D459,338 | S | | 6/2002 | Sterzick |
| D469,023 | S | | 1/2003 | Mah |
| 6,527,434 | B1 | | 3/2003 | Fox et al. |
| 6,554,680 | B2 | * | 4/2003 | Abbondandolo ............ 446/268 |
| 6,663,458 | B1 | * | 12/2003 | Jauregui ..................... 446/73 |
| D486,377 | S | * | 2/2004 | Kelleghan .................. D8/356 |
| 2003/0051317 | A1 | * | 3/2003 | Preziosi et al. ............ 24/3.12 |

FOREIGN PATENT DOCUMENTS

| JP | 05123456 A | * | 5/1993 |
| JP | 10118340 A | * | 5/1998 |
| JP | 2000330071 A | * | 11/2000 |

(Continued)

OTHER PUBLICATIONS

Website picture of "hip clips" from www.fiskars.com (1 page), dated Jun. 4, 2003.

(Continued)

Primary Examiner—James R. Brittain
(74) Attorney, Agent, or Firm—Michael R. Gilman; Kaplan Gilman Gibson & Dernier

(57) ABSTRACT

A novelty figurine and carabiner storage assembly is provided. The figurine comprises a head portion, a body portion located proximate to the head portion, and at least one carabiner attachment assembly extending from the body portion for selectively allowing the figurine to be attached to or removed from another item able to receive the attachment assembly. The carabiner attachment assembly comprises at least first and second leg assemblies, with one of the leg assemblies having a selectively openable gate assembly extending therealong. The body portion has at least one substantially hollow interior section and at least one selectively openable door assembly for access into the substantially hollow interior section.

2 Claims, 5 Drawing Sheets

FOREIGN PATENT DOCUMENTS

| | | | |
|---|---|---|---|
| JP | 2001078874 A | * | 3/2001 |
| JP | 2002126361 A | * | 5/2002 |
| WO | WO 8802605 A1 | * | 4/1988 |

OTHER PUBLICATIONS

"Carabiners Light the Way" from www.demstore.com (4 pages), dated Mar. 12, 2003.
Carabiner flashlight from www.branders.com (1 page), dated Mar. 20, 2003.
Carabiner Clip Travel Thermos from www.deakin.com (1 page), dated Mar. 13, 2003.
Bottle holder with carabiner from www.ekusa.com (1 page), dated Mar. 12, 2003.
Carabiner Water Bottle Holders from www.impression.ca (2 pages), dated Mar. 12, 2003 and Mar. 13, 2003.
Product H2Go from www.miksovsky.com (4 pages), dated Mar. 12, 2003.
Polar Bottle—Clip-It Carabiner from www.greatoutdoors.com (2 pages), dated Mar. 12, 2003.
Carabiner mug from www.surprise.com (1 page), dated Mar. 12, 2003.
Fuel bottles from www.russellsformen.com (2 pages), dated Mar. 13, 2003.
Carabiner pens—assorted colors from www.newdimensions1.com (1 page), dated Mar. 12, 2003.
Die-case metal carabiner clip with Compass from www.advantageindustries.com (1 page), dated Mar. 12, 2003.
360 Degree Clip Watch from www.promoplace.com (2 pages), dated Mar. 13, 2003.
Clip On Series Watch/Blue Bezel from www.promoplace.com (2 pages), dated Mar. 25, 2003.

* cited by examiner

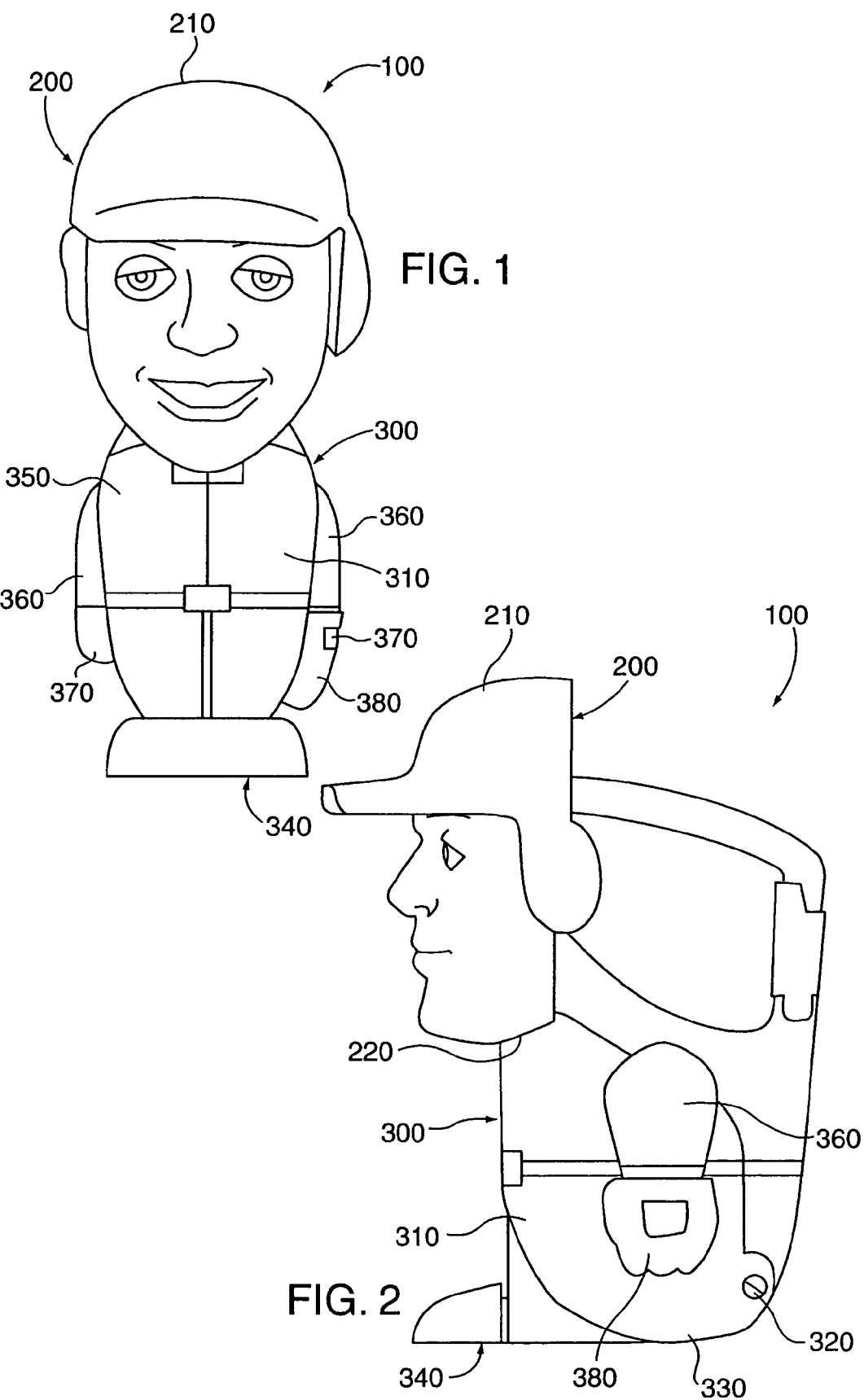

NOVELTY FIGURINE AND CARABINER STORAGE ASSEMBLY

FIELD OF THE INVENTION

The invention relates generally to novelty figurines bearing the portrait or resemblance of a person and a carabiner-type attachment device therefore, wherein the carabiner-type attachment device has a storage compartment.

BACKGROUND OF THE INVENTION

Toys and figurines have long been around bearing the portrait or resemblance of a person; usually of a famous person. It has even been a recent craze to use what has come to be known as a "bobble head" toy to bear the likeness of a famous sports figure.

In addition, carabiners have long been in use for providing a means for attaching articles to each other. Such devices have numerous applications, such as for example enabling articles to be quickly and easily secured to a backpack, purse, handbag, key chain, belt loop, utility belt, or the like. U.S. Pat. No. 5,005,266 discloses a typical carabiner-type attachment device.

It is also known to combine carabiners with other known useful items, as, for example, is disclosed in U.S. Pat. Nos. 5,270,909, 6,223,372 and 6,527,434, U.S. Design Pat. Nos. D459,338 and D469,023 and at the following websites www.fiskars.com, www.demstore.com, www.branders.com, www.advantageindustries.com and www.promoplace.com.

Such prior art devices, while useful in their own right for achieving their specific purposes, do not have the added benefit of incorporating a novelty toy item (the figurine) in a construction that allows the item to be easily, and safely, carried around by its owner/user on essentially any type of item, including any type of garment or bag. Further, none of these prior art devices comprise a way of allowing the owner/user of the novelty item to carry small objects therein, as, for example, candy or gum. It would therefore be desirable to provide such a novelty item preferably having a collectible figurine thereon. A further advantage of the subject invention would be to construct the item with a storage compartment for storage of items by the user.

SUMMARY OF THE INVENTION

In accordance with the invention, a novelty figurine and carabiner storage assembly is provided. The figurine comprises a head portion, a body portion located proximate to the head portion, and at least one carabiner attachment assembly extending from the body portion for selectively allowing the figurine to be attached to or removed from another item able to receive the attachment assembly. The carabiner attachment assembly comprises at least first and second leg assemblies, with one of the leg assemblies having a selectively openable gate assembly extending therealong. The body portion has at least one substantially hollow interior section and at least one selectively openable door assembly for access into the substantially hollow interior section.

It is an object of the present invention to provide an improved novelty figurine.

It is another object of the present invention to provide an improved novelty figurine having a carabiner-type attaching mechanism.

It is yet another object of the present invention to provide an improved novelty figurine having a substantially hollow interior section and a selectively openable door assembly to allow for access into the interior section.

Still a further object of the present invention is to provide an improved novelty figurine which is able stand in an upright orientation.

Yet a further object of the present invention is to provide an improved novelty figurine wherein the head portion is attached by a spring assembly, allowing the head portion to act as a "bobble-head" figurine.

Other objects of the invention will in part be obvious and will in part be apparent from the following description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 1 is a front elevational view of a first embodiment of the novelty figurine;

FIG. 2 is a side elevational view of the novelty figurine of FIG. 1;

DETAILED DESCRIPTION OF THE PREFERRED EMBODIMENTS

Figure 3:
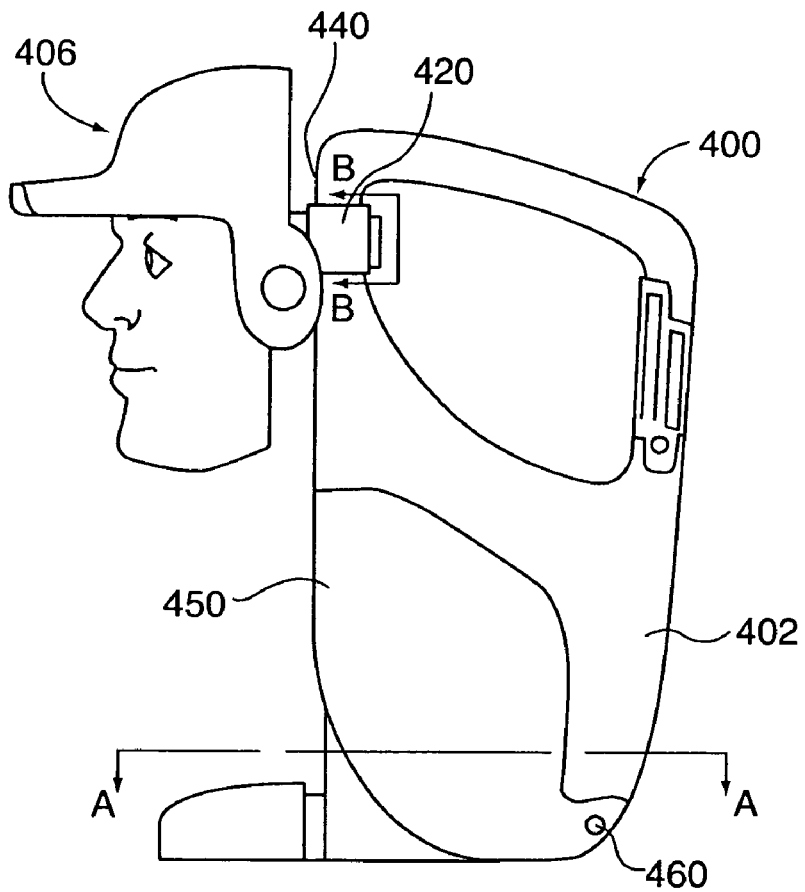
FIG. 3 is a side elevational view of another embodiment of the novelty figurine.

In the following description, for purposes of explanation, specific numbers, materials and configurations are set forth in order to provide a better understanding of the invention. It will be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in one embodiment," if any, in various places in the specification are not necessarily all referring to the same embodiment.

As seen in FIGS. 1 and 2, novelty figurine 100 has a head portion 200 and a body portion 300. Head portion 200 will normally consist of a facial portrait of a well known person, such as a sports figure. If, for example, the portrait is of a well known baseball player, head portion 200 will bear a baseball helmet/hat, seen in FIGS. 1 and 2 as 210. As the ballplayer will be known to be from a certain team, the particular team's insignia can be found on the helmet/hat 210 (not shown).

In the embodiment of FIGS. 1 and 2, head portion 200 is attached in and around chin/neck section 220 to a portion of body portion 300 in any known manner of connecting plastic elements together.

Figure 4:
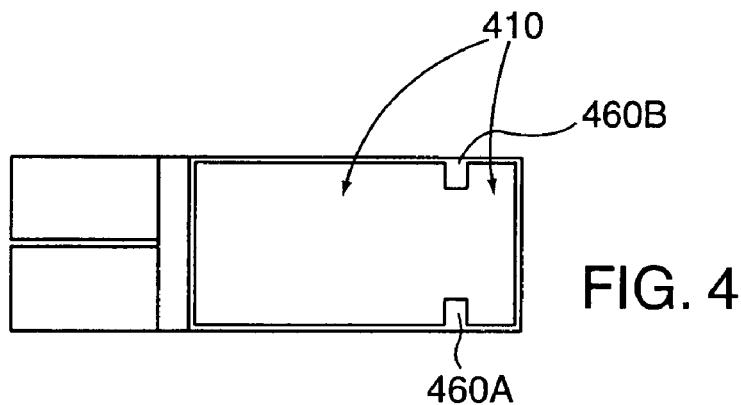
FIG. 4 is a cross-sectional view along line A—A of FIG. 3.

In a preferred embodiment, body portion 300 has an openable door assembly 310, which assembly is openable around a hinge 320. Skipping forward quickly to FIG. 6, the manner of rotation of door assembly 310 around hinge 320 is shown. Turning to FIGS. 3 and 4, the substantially hollow interior of body portion 300, including door assembly 310, is shown at 410. Turning back now to FIGS. 1 and 2, and the preferred embodiment, with head portion 200 attached at chin/neck section 220 to door assembly 310, door assembly 310 is opened around hinge 320 by unclipping of head portion 200 from body portion 300.

Figure 5:
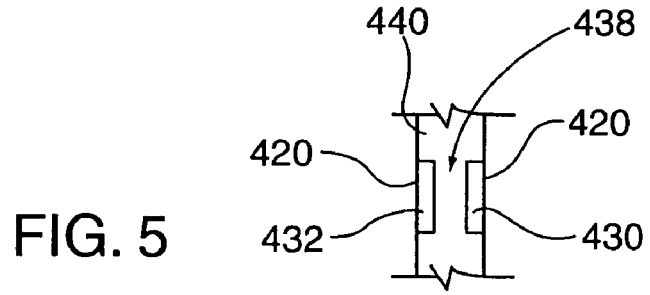
FIG. 5 is a view along line B—B of FIG. 3.

The best embodiment to see the clipping mechanism for head portion 200 is seen in figurine 400 of FIGS. 3 and 5 at 420. In particular, as seen in FIG. 5, clipping assembly 420 has clipping arms 430 and 432 defining a clipping space 438 therebetween. In practice, in order to secure head portion 200 to the uppermost section 440 of body portion 402, head portion 406 is simply pushed against uppermost portion 440 of body portion 402 so that portion 440 is received against clipping space 438. Once enough force is applied, clipping arms 430 and 432 will separate even further, allowing them to slide around the outsides of portion 440 until clipping arms 430 and 432 are received totally around portion 440 so that clipping space 438 goes back to its at rest position. In its at rest position, clipping space 438 is narrower than the thickness of portion 440 so that head portion 406 does not, too easily, disengage from its secured position around portion 440. However, clipping space 438 is not so small as to make it difficult for selective removal of head portion 406 from around portion 440.

In the embodiment of FIGS. 1 and 2, where head portion 200 is attached to body portion 300 at chin/neck section 220, when head portion 200 is removed from portion 440 by the disengaging of clip assembly 420, not only is head portion 200 removed from contact with body portion 300, but door assembly 310 is pivoted around hinge 320 so as to open door assembly 310.

Turning back to the embodiment of FIGS. 3–6, while in the preferred embodiment of FIGS. 1 and 2 the head portion is attached to the body portion so that the door assembly and the head portion move as one unit, it is seen in the embodiment of FIGS. 3–6 that it is possible for door assembly 450 to not be attached to head portion 406, such that door assembly 450 may pivot around hinge 460 independently of head portion 406. In this alternate embodiment of the preferred embodiment, a securing mechanism is found at an uppermost portion of door assembly 450, see FIG. 6. This securing mechanism will have a portion thereof secured to body portion 402, while another portion thereof is secured within door assembly 450. The portion extending from body portion 402 is found at 454, while the portion on door assembly 450 is seen at 456 of FIG. 6. Assemblies 454 and 456 can be as simple as male and female clip assemblies, or any other known manner of allowing for clipping security while also allowing for ease of unclipping of two elements together. It is believed that this type of mechanism is well known in the art.

Turning to FIGS. 7–11, additional alternate embodiments of the invention are shown. In particular, in FIG. 7, novelty figurine 500 has a smaller door assembly 510 than the one shown in the embodiments of FIGS. 1–6. In this way, door assembly 510 will not have a hollow interior for receipt therein of items (such as candy), but the entire hollow interior will be found within the main body portion 520. In this embodiment door assembly 510 pivots around hinge assembly 530.

Figure 8:
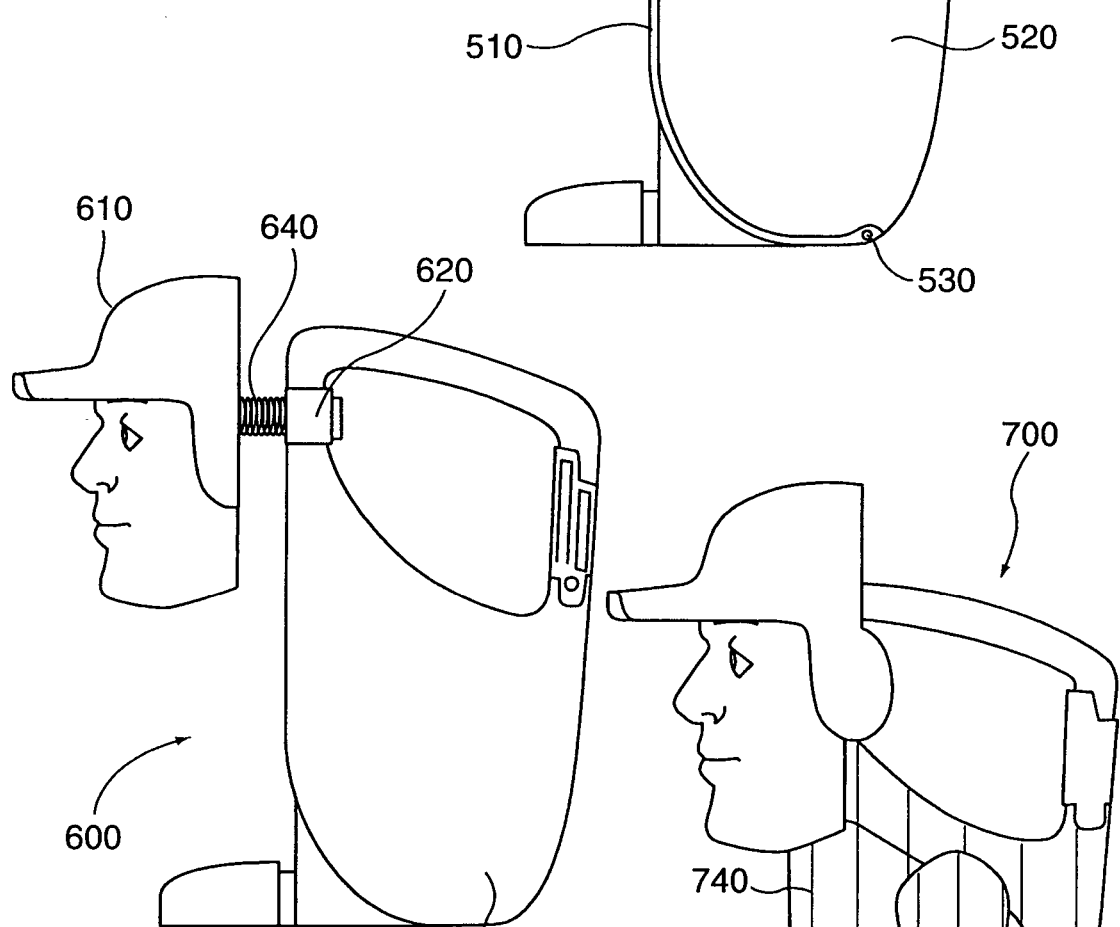
FIG. 8 is a side elevational view of yet another embodiment of the novelty figurine.

Regarding the embodiment of FIG. 8, two things of import are noted: (1) head portion 610 of figurine 600 is attached to clip assembly 620, and therefore body portion 630, through use of a spring 640; and (2) there is no door assembly. Spring 640 gives head portion 610 the ability to be a "bobble-head" construction.

Figure 9:
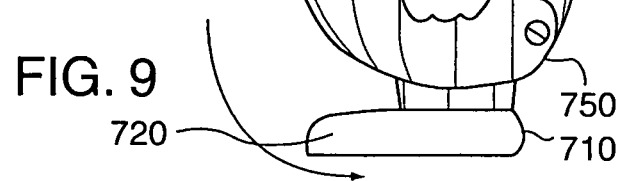
FIG. 9 is a side elevational view of a further embodiment of the novelty figurine.

Figurine 700 of FIG. 9 shows an alternate embodiment for support structure 710. In particular, as will be discussed in more detail below, in the embodiments of FIGS. 1–8, the support structure of the novelty figurine is dependant upon both a lowermost portion of the body portion of the item and the feet extending therefrom. In the embodiment of FIG. 9, support structure 710 consists solely of feet 720, no reliance on the bottom most portion of body portion 730 is required. In this embodiment door assembly 740 pivots around hinge assembly 750.

Figure 10:
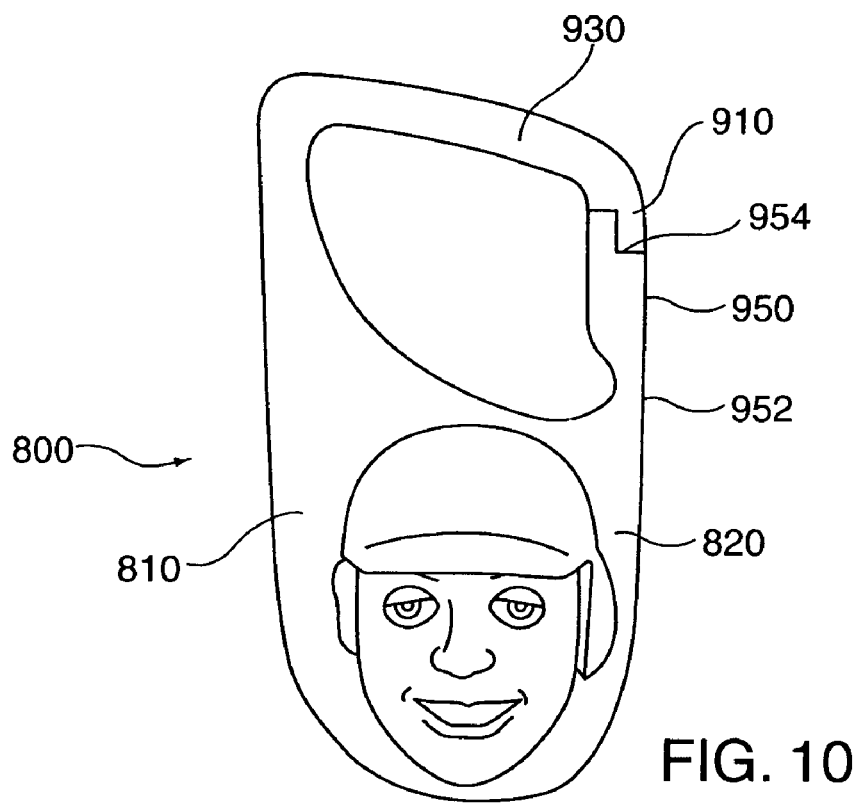
FIG. 10 is a side elevational view of still a further embodiment of the novelty figurine.
Figure 11:
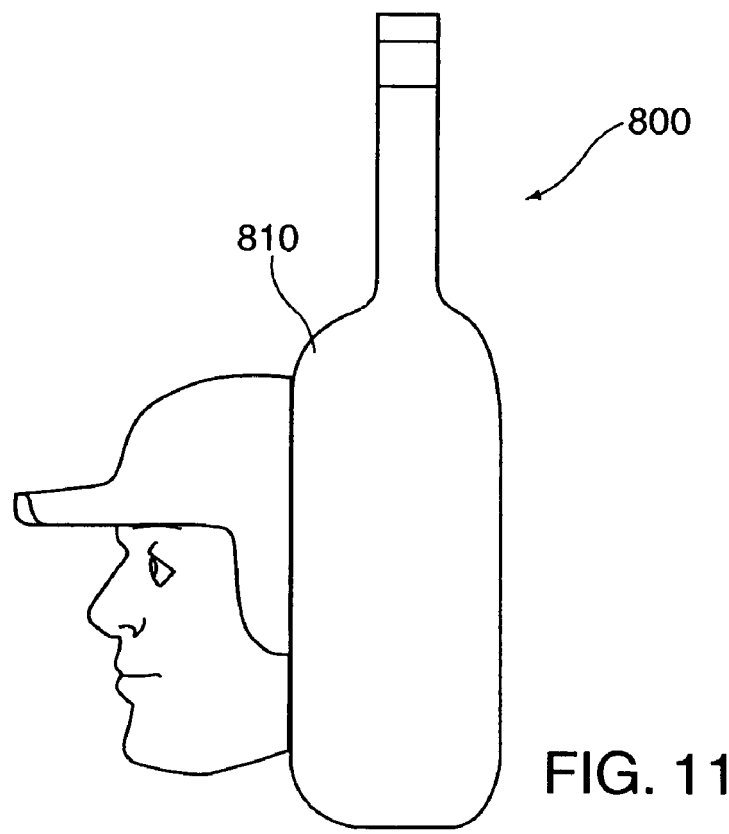
FIG. 11 is back side elevational view of the novelty figurine of FIG. 10.

FIGS. 10 and 11 show yet another embodiment of the invention, wherein a 3-dimensional facial portrait of a person protrudes from a receiving surface 810 of figurine 800.

Turning in general to a discussion of the various hinge assemblies of the body sections of the embodiments, attention is directed to FIG. 4. There, hinge 460 is shown to consist of element 460A and 460B, which are dowel-like elements extending through holes in body portion 402 into the hollow interior 410. Elements 406A and B are part of door assembly 450. It is, however, understood that any known manner of constructing a hinge assembly, or other known manner of pivoting a door such as that found herein, is anticipated in the invention.

Tying all of the figures and embodiments together, it is to be noted that different elements of different embodiments are not meant to be restricted to the particular embodiments in which they are shown and discussed, but may be interchanged with other elements from other of the figures/embodiments. In particular, while the clipping assembly for 200 is not shown for the embodiment of FIGS. 1 and 2, it is to be understood that such a clipping assembly as is found in the embodiment of FIGS. 3–6 can be found behind head portion 200 of FIGS. 1 and 2, so that head portion 200 and door assembly 310 may be pivoted downwards around hinge 320 to allow access to the interior chamber thereof. In addition, the smaller door assembly 510 of FIG. 7 can be incorporated into any of the embodiments shown in the other figures having a door assembly. Even further, support structure 710 having only feet 720 as shown in FIG. 9 can also be associated with any of the embodiments. This is also true of the "bobble-head" structure shown in FIG. 8, and the hinge structure shown in FIG. 4.

It is also to be understood that in those embodiments where the head portion is not attached to the body portion, as it is in FIGS. 1 and 2, different head portions from different figure assemblies can be interchanged. In particular, the invention anticipates that a baseball fan could have a collection of these novelty figurines, and if they are of the embodiment where the door assembly is separate from the head portion, the different player's heads can be interchanged from assembly to assembly using clip assembly 420.

Turning now to a discussion of the support mechanism for the various embodiments, as has been earlier mentioned, the support structure for the embodiments of FIGS. 1–8 is slightly different from that of the support structure shown in FIG. 9. FIGS. 1–8 the support structure comprises use of both the lowermost portion of the body portion of the assembly and a foot-structure. In particular, directing attention to the embodiment of FIGS. 1 and 2, the support structure comprises using the substantially lowermost portion 330 of body member 300 and the leg and feet assembly 340. As seen if FIG. 1, in the front elevational view, with leg/feet assembly 340, head portion 200 and a body portion 350, a full figurine is created, even having arms 360 and hands 370 along with a baseball glove 380, should the figurine be of a baseball player.

Figure 6:
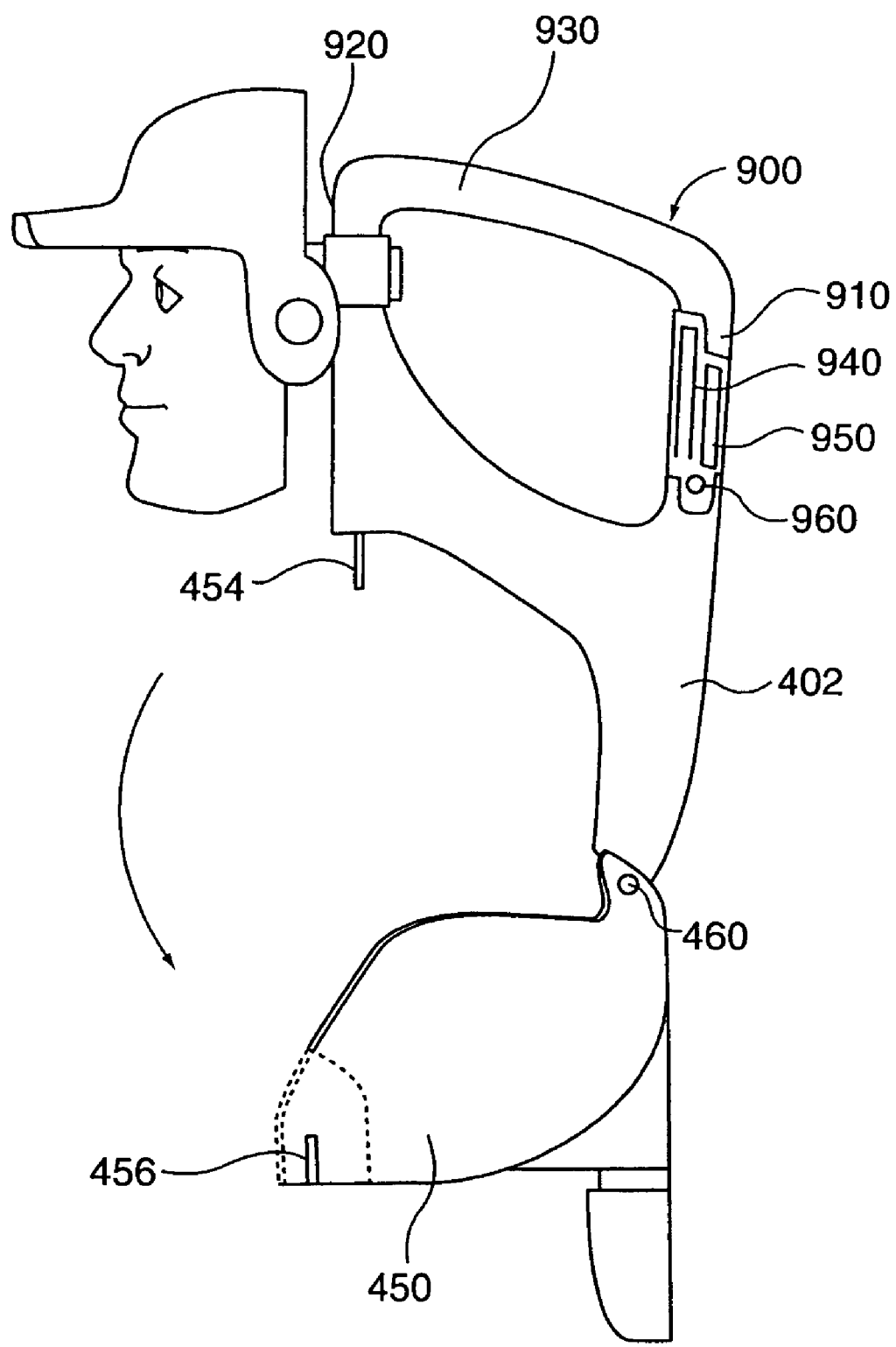
FIG. 6 is a side elevational view of the novelty figurine of FIG. 3, showing the door assembly in its open condition.
Figure 7:
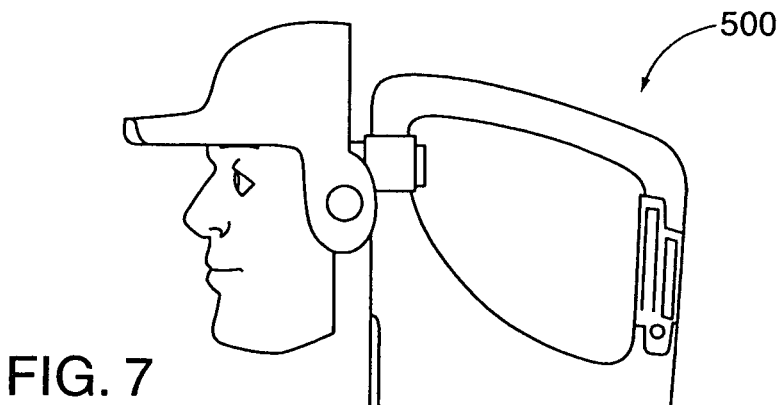
FIG. 7 is a side elevational view of still another embodiment of the novelty figurine.

Finally turning to a discussion of the carabiner assembly of the invention, as seen in all of the embodiments, the novelty figurine has a carabiner assembly. Turning to FIG. 6, it is seen that carabiner assembly 900 has in the preferred embodiment a first leg 910, a second leg 920 and a third leg 930. Leg 910 has a gate assembly 940 extending therealong. Two embodiments of gate assembly 940 exists. The one shown in FIGS. 1–9 and the one shown in FIGS. 10 and 11. As is known of the typical carabiner gate assembly, the gate is selectively openable and automatically closes upon release thereof. In the embodiments of the gate shown if FIGS. 1–9, gate 950 pivots around hinge 960 and a bias spring assembly (not shown) forces gate 950 to the closed position of FIG. 6 upon removal of any force bearing against gate 950. For the gate embodiment of FIGS. 10 and 11, gate 950 is made of a resilient material, such as but not limited to rubber, plastic, or any other suitable material as is well known in the art. A first end 952 of gate 950 extends out from body 820. A second end 954 of gate 950 contacts, or is in close proximity to, another end of first let 910, which portion is in contact with leg 930. In this embodiment, a resilient attachment device is formed without a pivoting hinge. Gate 950 simply deforms when pressure is applied so as to place gate 950 in an open position, and resiliency returns it to its original closed position when the pressure is released.

It will thus be seen that the objects set forth above, among those made apparent from the preceding description, are efficiently attained, and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A novelty figurine, comprising:
a head portion having a front;
a body portion located proximate said head portion, said body portion comprising
   at least one substantially hollow interior section and at least one selectively openable door assembly for access into said substantially hollow interior section; and
   at least one carabiner attachment assembly extending from said body portion for selectively allowing said figurine to be attached to or removed from another item able to receive said attachment assembly, said attachment assembly comprising at least a first leg having a selectively openable gate assembly extending therealong;
means to support said figurine in a substantially upright, standing position, with said head portion located substantially above said body portion;
said hinge assembly located at a bottom section of said body portion so that a substantially uppermost portion of said door assembly is proximate said head portion when said door assembly is in said closed position and said substantially uppermost portion of said door assembly is rotatingly displaced downward therefrom when said door assembly is in said open position;
said head portion connected to said door assembly at said substantially uppermost portion thereof;
said head portion further comprising selectively releasable securing means extending rearwardly from said head portion for selectively securing said head portion to an uppermost section of said body portion when said door assembly is in said first, closed position; said securing means comprising a clip assembly having first and second clipping arms attached to the rear of said head portion at first ends thereof, said first and second clipping arms defining a clipping space therebetween at second ends thereof, said clipping space receiving a portion of said body portion so that said door assembly is retained in said first, closed position.

2. A novelty figurine, comprising:
a head portion having a front; a body portion located proximate said head portion, said body portion comprising
   at least one substantially hollow interior section and at least one selectively openable door assembly for access into said substantially hollow interior section; and
   at least one carabiner attachment assembly extending from said body portion for selectively allowing said figurine to be attached to or removed from another item able to receive said attachment assembly, said attachment assembly comprising at least a first leg having a selectively openable gate assembly extending therealong;
means to support said figurine in a substantially upright, standing position, with said head portion located substantially above said body portion;
said hinge assembly located at a bottom section of said body portion so that a substantially uppermost portion of said door assembly is proximate said head portion when said door assembly is in said closed position and said substantially uppermost portion of said door assembly is rotatingly displaced downward therefrom when said door assembly is in said open position;
said head portion being said substantially uppermost portion of said door assembly;
said head portion further comprising selectively releasable securing means extending rearwardly from said head portion for selectively securing said head portion to an uppermost section of said body portion when said door assembly is in said first, closed position;
said securing means comprising a clip assembly having first and second clipping arms attached to the rear of said head portion at first ends thereof, said first and second clipping arms defining a clipping space therebetween at second ends thereof, said clipping space receiving a portion of said body portion so that said door assembly is retained in said first, closed position.

* * * * *